(12) United States Patent
Harris et al.

(10) Patent No.: US 7,546,133 B2
(45) Date of Patent: Jun. 9, 2009

(54) SYSTEM AND METHOD FOR AUTOMATIC USER AVAILABILITY SETTING

(75) Inventors: John M. Harris, Chicago, IL (US); Sean S. Kelley, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 658 days.

(21) Appl. No.: 11/189,631

(22) Filed: Jul. 26, 2005

(65) Prior Publication Data

US 2007/0026882 A1    Feb. 1, 2007

(51) Int. Cl.
*H04B 7/00* (2006.01)
*H04Q 7/20* (2006.01)

(52) U.S. Cl. .............. 455/518; 455/519; 455/90.2; 370/261

(58) Field of Classification Search ......... 455/518–520, 455/90.2, 445; 709/206, 224, 225, 245; 370/260, 370/261, 252, 338, 329, 342
See application file for complete search history.

(56) References Cited

U.S. PATENT DOCUMENTS

| 2004/0022524 | A1 | 2/2004 | Bak et al. |
| 2004/0037396 | A1* | 2/2004 | Gray et al. ................. 379/67.1 |
| 2005/0021773 | A1 | 1/2005 | Shiga et al. |
| 2005/0054361 | A1 | 3/2005 | Turcanu et al. |
| 2005/0102389 | A1* | 5/2005 | Liscano et al. ............. 709/224 |
| 2005/0143111 | A1 | 6/2005 | Fitzpatrick et al. |
| 2006/0190600 | A1* | 8/2006 | Blohm et al. ............... 709/225 |
| 2006/0256731 | A1* | 11/2006 | Jennings et al. ............ 370/252 |
| 2007/0002779 | A1* | 1/2007 | Lee et al. ..................... 370/260 |
| 2007/0161392 | A1* | 7/2007 | Ono et al. ................... 455/518 |
| 2008/0117839 | A1* | 5/2008 | Raju et al. .................. 370/261 |

* cited by examiner

*Primary Examiner*—Sujatha Sharma

(57) ABSTRACT

At least one condition concerning a first user (102) within a communication network is obtained. Presence information of a second user (114) within the communication network is determined based upon the at least one condition of the first user (102). The presence information of the second user is then projected to the first user (102).

4 Claims, 4 Drawing Sheets

SYSTEM AND METHOD FOR AUTOMATIC USER AVAILABILITY SETTING

FIELD OF THE INVENTION

The field of the invention relates to enhancing the productivity of users in communication networks.

BACKGROUND OF THE INVENTION

Users of communication systems often do not wished to be interrupted by a calling party under certain circumstances. For example, a user may not wish to be interrupted while engaged in certain tasks or projects. In another example, a user may not wish to be interrupted when they are in the presence of other users, such as a supervisor.

Such interruptions negatively impact the productivity of users. For instance, if the user is interrupted while working on a project, it may take a great deal of effort for the user to re-establish their work on the project.

Previous systems attempted to increase worker productivity by defining the availability of a target user and presenting this availability to the originating user. The availability was then used to determine whether the target user could be interrupted by the originating user. For instance, if the target user were engaged in an important meeting, the availability of the target user was typically set to a low value. Conversely, when the target user was located at their office, their availability was typically set to a higher value. Consequently, the target user would not be interrupted by the originating user when the target user was deemed to be unavailable and the productivity of the target user was correspondingly enhanced.

Unfortunately, previous approaches still operated ineffectively under many circumstances. For instance, previous systems projected the same availability of the target user to an originating user, regardless of the circumstances at the originating user. For example, the same availability of the target user would be projected to the originating user regardless of the topic of the intended call or the quality of the communication environment. Consequently, originating users with whom the target wished to communicate often were blocked while unwanted interruptions by originating users with whom the target did not wish to communicate frequently still occurred. These problems increased user frustration with the system, degraded the experience of the target user, and ultimately reduced worker productivity.

Figure 1:
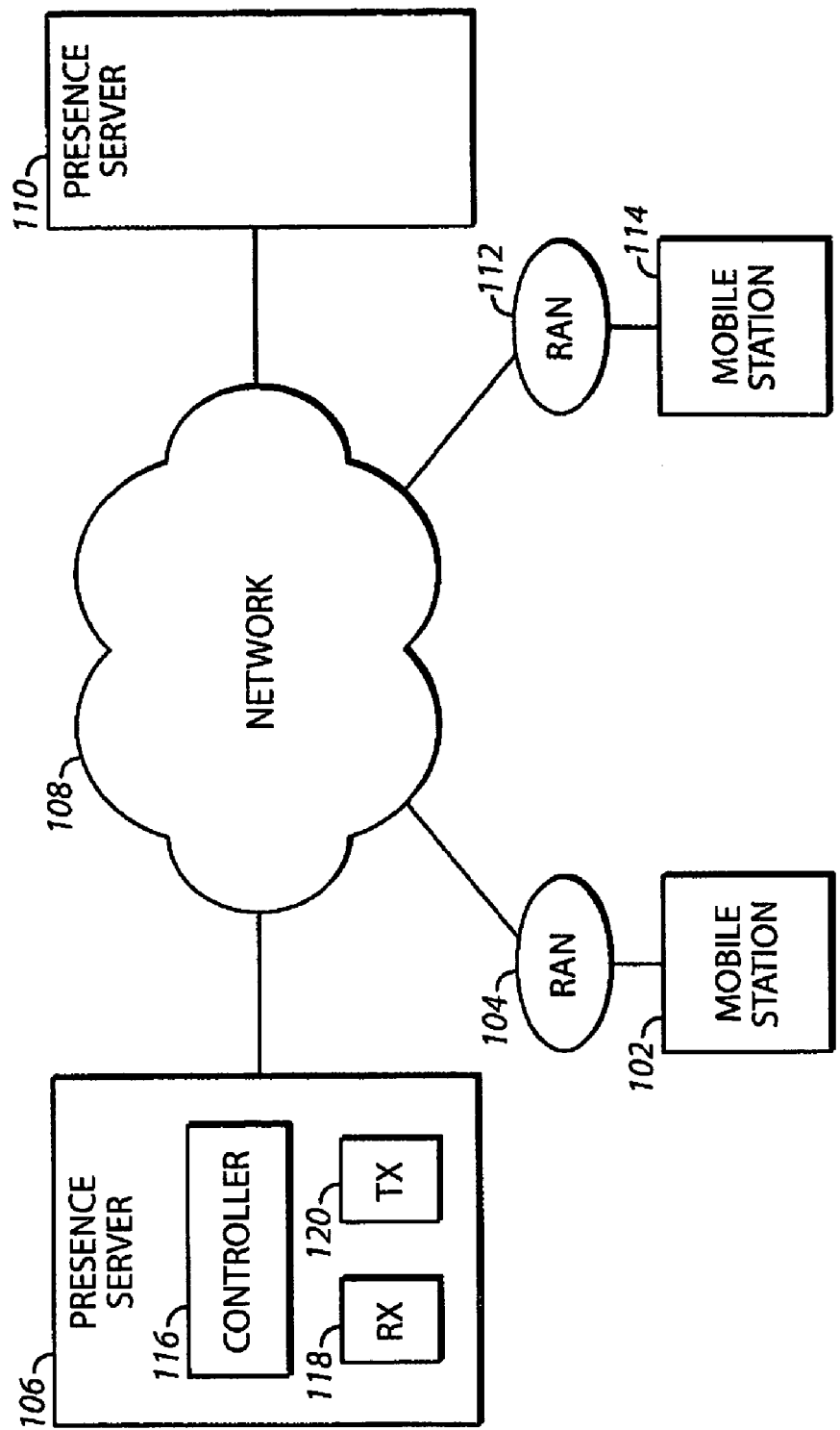
FIG. 1 is a block diagram of a system for setting presence information according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method for setting presence information in a network allows the presence information of a second user to be based upon at least one condition associated with a first user. The present approaches allow different presence information to be projected to different users, and allows the presence information of the second user (that is projected to the first user) to be dynamically based upon at least one condition or characteristic associated with the first user or other users. The present approaches also allow for efficient transitions between projects while avoiding unwanted interruptions of users.

In many of these embodiments, at least one condition associated with a first user operating within a communication network is obtained. Presence information (such as availability) of a second user also operating within the communication network is determined based upon the at least one condition associated with the first user. This presence information of the second user is then projected to the first user. In one example, the presence information is an availability that may be set to an increased level when the first user is working on the same project or topic as the second user and set to a lower level when the first and second users are working on different projects.

The at least one condition associated with the first user may take a variety of forms. For example, the at least one condition may be presence information (such as availability for certain communication types, mood, activity, or any other information obtained through a presence service) associated with the first user, a characteristic of a call at the first user, the identity of a folder being accessed by the first user, the type of document being accessed by the first user, an email being addressed, or a phrase in a document being accessed by the first user. In other examples, the at least one condition may be related to the location of the first user, the location of the first user relative to the second user, whether the first user is driving a vehicle, the visual communication capability of the first user, or whether the first user is attending a meeting. In still other examples, the at least one condition may be associated with the voice quality environment of the first user, a call history statistic of the first user, whether the first user is using a speaker phone, whether the first user is participating in a Push-to-Talk (PTT) call, whether the first user has a low reputation of having calls made by the second user being answered (or vice versa), or whether the first user is at a location where calls are answered infrequently.

In other examples, the at least one condition may be obtained from a third user. This information (related to the third user) may be used to determine the unavailability of the second user to the first user when a predetermined condition associated with the third user exists. For instance, the predetermined condition may indicate that the third user is unavailable, that the third user is not associated with a predetermined presence attribute value, that the third user is in the vicinity of the first user and is on a blacklist of the second user, or that the third user is in the vicinity of the first user and has a ranking status. Other conditions are possible.

In others of these embodiments, a presence policy of a second user is configured. A first user subscribes to the presence information of the second user and the availability of the second user to the first user is automatically determined using the presence policy and at least one presence attribute of the first user. The availability of the second user may then be sent to the first user. For instance, the presence policy may be based upon the activity of the first user or the location of the first user. Other examples of presence policy information are possible.

Thus, the availability of a second user may be projected to a first user based upon circumstances at the first user. As a result, unwanted interruptions are reduced or eliminated while higher-value communications are allowed to occur. Consequently, the productivity of users is enhanced.

Referring now to FIG. 1, one example of a system for setting the availability of a user is described. A mobile station 102 is connected to a Radio Access Network (RAN) 104. Similarly, a mobile station 114 is connected to another RAN 112. The presence server 106, RAN 104, and RAN 112 are connected to a network 108. A second presence server 110 is coupled to the network 108. Although two presence servers are shown, it will be understood that a single presence server or more than two presence servers may be used.

The mobile stations 102 and 114 may be any type of wireless mobile communication device. For instance, they may be cellular telephones, pagers, personal digital assistants, or personal computers. Other examples of mobile stations are possible.

The RANs 104 and 112 allow the mobile stations to access the presence server 106 and to access the network 108. For instance, the RANs 104 and 112 may include base stations, receivers, transmitters, and base station controllers to support these functions.

The presence server 106 may include a controller 116, receiver 118, and transmitter 120. The presence server 106 may be supplied with presence information related to the users operating the mobile stations, store the presence information, and determine the presence information to project to other users and project this determined presence information to other users. The presence server 110 may include the same components.

The network 108 may be any single or multiple combinations of networks that allow the presence server 106 and other entities to communicate. For instance, the network 108 may be the Internet, a wireless network, a landline network, or any combination of these networks.

In one example of the operation of the system of FIG. 1, conditions concerning a first user at the mobile station 102 are obtained by the presence server 106 or 110. The presence information of a second user at the mobile station 114 is determined by the presence server 106 or 110 and is based upon the conditions associated with the first user at the mobile station 102. The presence information of the second user at the mobile station 114 is then projected to the first user at the mobile station 102. In one example, the presence information is the availability of the second user to the first user, and the availability may be set to an increased level when the first user is working on a same project or topic as the second user.

The conditions concerning the first user may take a variety of forms. For example, the presence information may be a characteristic of a call answering mode at the first user (such as whether the target is operating in automatic answer mode or manual answer mode). In another example, a characteristic of a call at the first user such as whether the user just completed a call with a ranking user, or completed a call where the audio contained with an INVITE message meets criteria (e.g., contains certain words such as "emergency," "injury", or "911" or the speaker is determined to be frustrated) may be used. In still another example, the identity of a folder being accessed by the first user, the type of document being accessed by the first user, an email being addressed by the first user, or a phrase in a document being accessed by the first user may be considered.

In still other examples, the conditions concerning the first user may be the location of the first user (e.g., at home, at the office), the location of the first user relative to the second user, whether the first user is driving a vehicle, the visual communication capability of the first user (e.g., the user has capability to receive video images), or whether the first user is attending a meeting or watching television. In still other examples, the conditions may be the voice quality environment of the first user (where one user wishes to be available to other users that are currently in situations where they can communicate with good voice quality), a call history statistic of the first user (e.g., number of dropped calls), whether the first user is using a speaker phone, whether the first user is participating in a Push-to-Talk (PTT) call, whether the first user has a low reputation of having calls being answered (or vice versa), or whether the first user is at a location where calls are answered infrequently.

In other examples, conditions concerning a third user are obtained, and information indicating an availability of the second user to the first user may be projected when a predetermined condition associated with the third user exists. For instance, the predetermined condition may be that the third user, is available or unavailable (e.g., the user may only want to be available to another user if a specific third user on the project is also available). In another example, the condition may be that the third user is not associated with a predetermined presence attribute value, that the third user is in a vicinity of the first user and is on a blacklist of the second user (e.g., the second user does not wish to be available to the first user if the first user is standing next to the third user and third user is on a blacklist of the second user). In still another example, the condition may be that the third user is in a vicinity of the first user and has a ranking status (e.g., the second user does not wish to appear unavailable to the first user if the first user is standing next to a ranking user and the second user will likely gain visibility to the ranking user if the first user calls the second user while the first user is standing next to the ranking user). Other conditions are possible.

In this example, the controller 116 in the presence server 106 or 110 is adapted (e.g., programmed) to receive conditions concerning the first user via the receiver 118 and to determine the presence information of the second user based upon the conditions of the first user. The controller then transmits the determined presence information to the first user via the transmitter 120.

Figure 2:
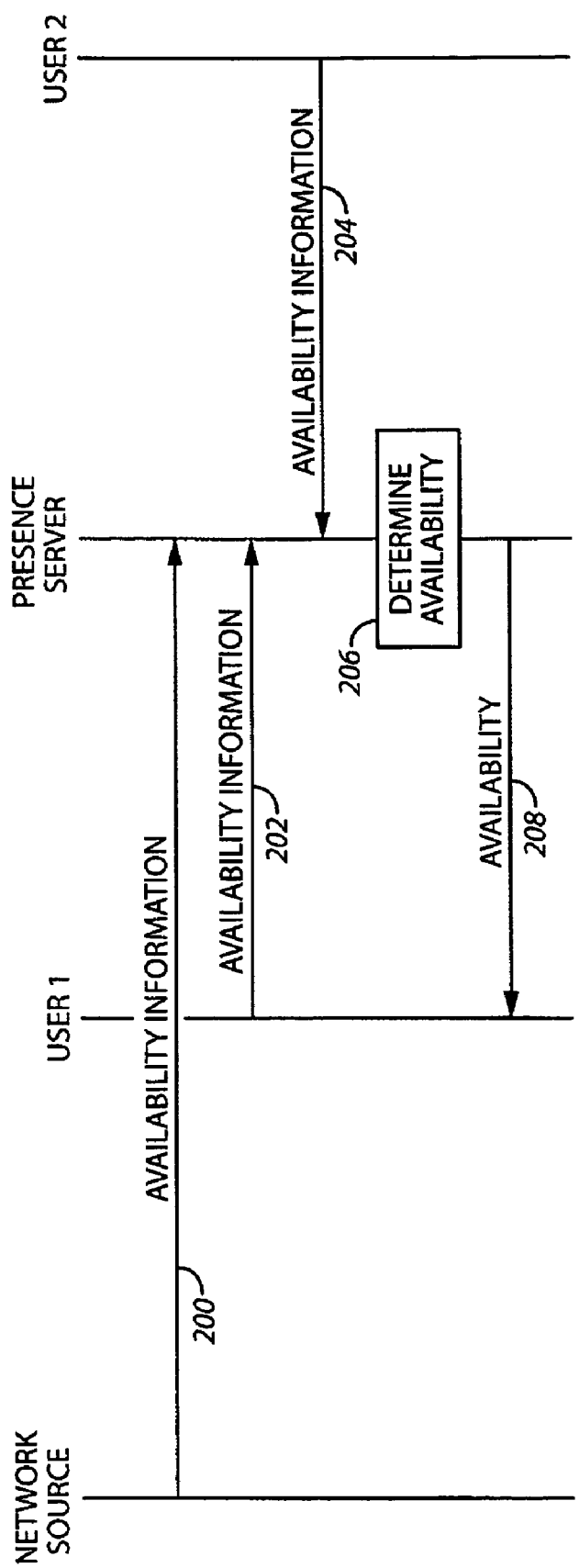
FIG. 2 is a call flow diagram of an approach for setting presence information according to various embodiments of the present invention.

Referring now to FIG. 2, one example of an approach for setting presence information (e.g., availability) of a user is described. In this example, a server gathers information concerning users from different sources, determines availabilities, and projects these availabilities to system users.

At step 200, information is sent from network sources to a presence server. For instance, this information may include the voice quality environment of the first user, a presence attribute of the first user, a call history statistic of the first user, whether the first user is using a speaker phone, whether the first user is participating in a Push-to-Talk (PTT) call, whether the first user has a low reputation of having calls made by the second user of being answered, or whether the first user is at a location where calls are answered infrequently. The network source can be an entity within the network such as a location server or PoC server, or an entity within the RAN such as a base station controller. Other examples are possible.

At step 202, availability information from a first user may be sent to the presence server. This information may include a characteristic of a call at the first user, the identity of a folder being accessed by the first user, the type of document being accessed by the first user, an email being addressed by the first user, or a phrase in a document being accessed by the first user, to name but a few. The information may be sent by the mobile station of the first user, or a personal computer of the first user. Other examples are possible.

At step 204, presence information from a second user is sent to the presence server. For instance, this information may include the projects on which the second user is working or documents currently opened by the second user.

At step 206, the availability of the second user to the first user may be determined from the information received at steps 200, 202 and 204. For example, the availability of the second user may be set to an increased level when it is determined by the server that the first user is working on a same project or topic as the second user. Other examples of availability determinations are possible. At step 208, the availability of the second user is projected to the first user and the first user can determine whether the second user is available to accept their call.

Figure 3:
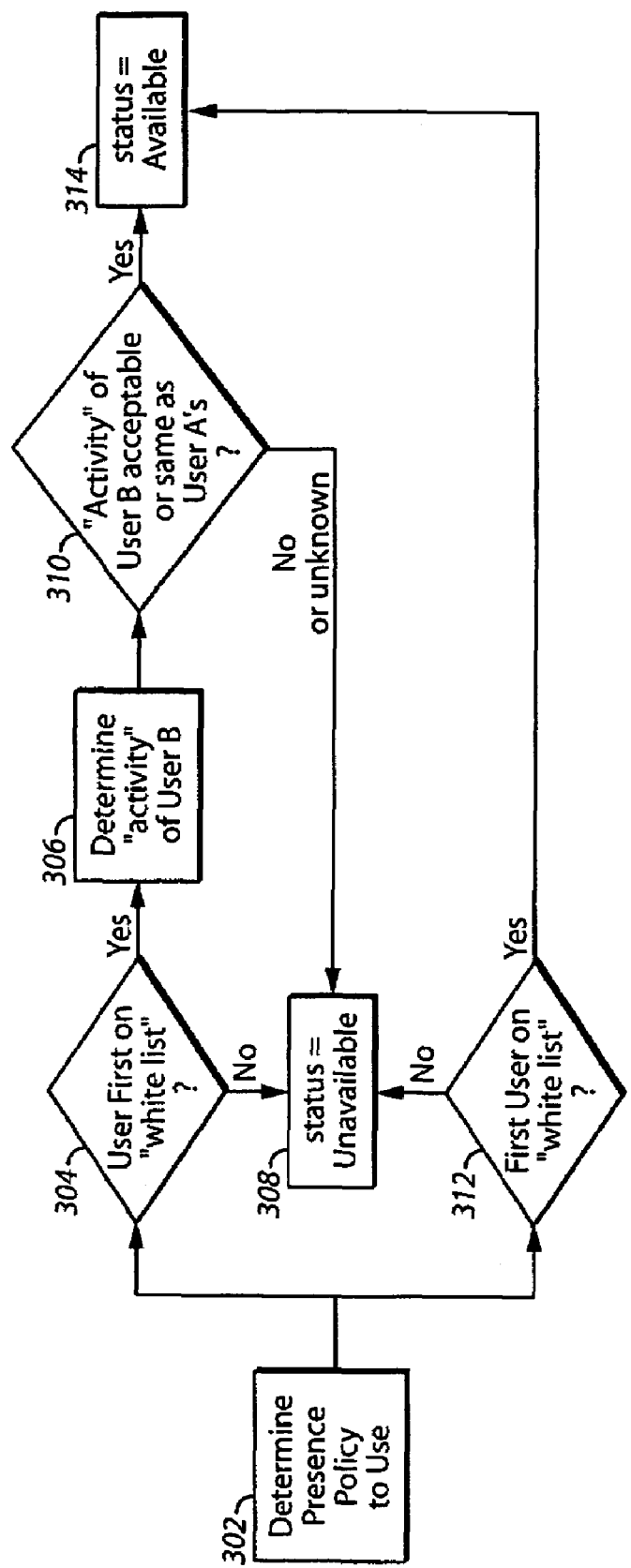
FIG. 3 is a flowchart of an approach for setting presence information according to various embodiments of the present invention.

Referring now to FIG. 3, another example of an approach for setting presence information (e.g., availability) of a second user to a first user in a network is described. In this example, first and second presence policies are available to determine user availability. At step 302, it is determined which of the first or second presence policy will be used. This determination may be based upon user input or some other factor, and if there is only one presence policy, this step may be omitted. At step 304, if the first policy applies, it is determined whether the first user is on a white list of users with which the second user wishes to communicate. If the answer is negative, then at step 308, the availability status is set to be unavailable. If the answer is affirmative, then at step 306, a condition (e.g., activity) is determined for the first user. At step 310, it is determined if the activity of the first user is acceptable or the same as the activity of the second user. If the answer is affirmative, at step 314, the availability status is set to be available. If the answer is negative, the availability status is set to be unavailable at step 308.

If step 302 indicates the second policy should be used, at step 312, it is determined whether the first user is on a white list of the second user. If the answer is affirmative, execution continues with step 314 where the availability status is set to be available. If the answer is negative, then at step 308, the availability status is set to be unavailable.

Figure 4:
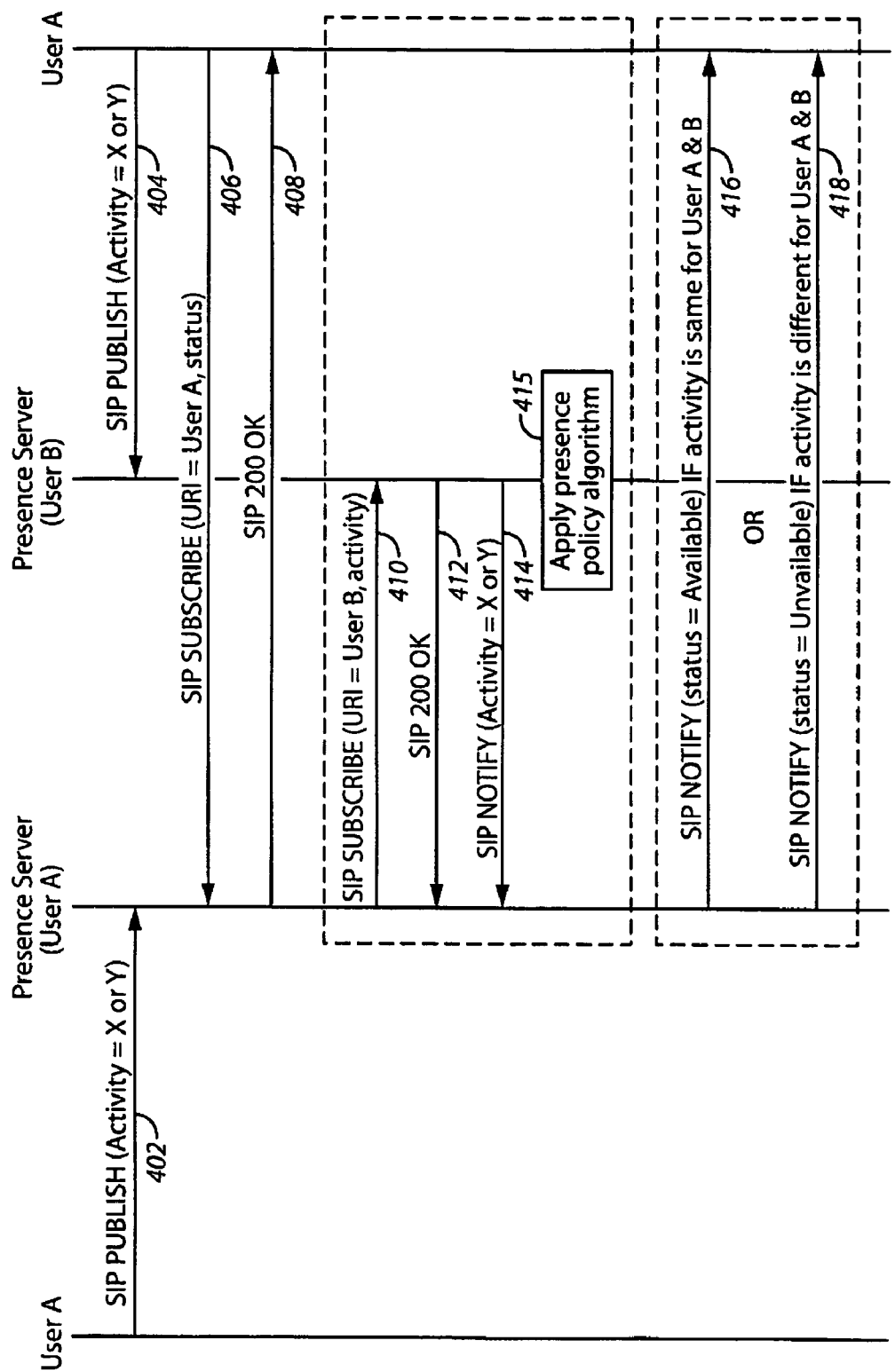
FIG. 4 is a call flow diagram of another approach for setting presence information according to various embodiments of the present invention.

Referring now to FIG. 4, another example of an approach for setting user availability is described. In this example, the presence information for a second user is determined and projected to a first user. The example described utilizes the Session Initiation Protocol (SIP) or a SIP-compliant protocol. However, it will be understood that other protocols or combination of protocols can also be used.

At step 402, a SIP PUBLISH request identifying an activity for a second user is sent from the second user to a second presence server associated with the second user. At step 404, a SIP PUBLISH request identifying an activity of the first user is sent from the first user to a first presence server associated with the first user. Through this diagram, each SIP request is followed by a 200 OK response message (which are usually not shown for simplicity).

At step 406, a SIP SUBSCRIBE request is sent from the first user to the second presence server. The SIP SUBSCRIBE request includes the Uniform Resource Identifier (URI) of the second user and optionally a filter file for status indicating that the first user subscribes to the presence status (e.g., availability) of the second user. At step 408, the second presence server sends a SIP 200 OK response message to the first user, indicating that the subscription has been accepted.

In this example, the presence policy algorithm for determining the availability of the second user to the first user depends upon the activity of the first user. Consequently, the second presence server must first determine the activity of the first user before applying the presence policy algorithm. At step 410, a SIP SUBSCRIBE request is sent from the second presence server to the first presence server. The SIP SUBSCRIBE request includes the Uniform Resource Identifier (URI) of the first user and optionally a filter for activity indicating that the activity of the second user is being subscribed. At step 412, a SIP 200 OK response is sent from the first presence server to the second presence server indicating that the subscription has been accepted. At step 414, a SIP NOTIFY request is sent from the first presence server to the second presence server indicating the activity of the first user. At step 415, an availability algorithm is applied (such as the one described with respect to FIG. 3) to determine if the second user is available to the first user.

Based upon the results of step 415, one of two messages is sent from the second presence server to the first user. If the determined availability status is available, at step 416 a SIP NOTIFY indicating availability is sent. On the other hand, if the determined status is unavailable, a SIP NOTIFY indicating unavailability is sent to the first user at step 418.

Thus, different availabilities of a second user may be projected to the first user based upon conditions or characteristics associated with the first user. The present approaches also allow for efficient transitions between projects while avoiding unwanted interruptions at a user. Consequently, user productivity is significantly enhanced using the approaches described herein.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What Is Claimed Is:

1. A method for determining presence information of users, the method comprising;
   obtaining a condition concerning a first user within a communication network;
   determining presence information of a second user within the communication network based upon the condition of the first user;
   projecting the presence information of the second user to the first user; and
   obtaining a condition concerning a third user;
   wherein the condition of the first user is selected from the group consisting of; presence information associated with the first user a characteristic of a call at the first user; an identity of a folder being accessed by the first user a type of document being accessed by the first user; an email being addressed by the first user; a phrase in a document being accessed by the first user; a location of the first user relative to the second user; whether the first user is driving a vehicle; a visual communication capability of the first user; whether the first user is attending a meeting; a voice quality environment of the first user; a call history statistic of the first user; whether the first user is using a speaker phone; whether the first user is participating in a Push-to-Talk call; whether the first user has a low reputation of having calls of being answered; and whether the first user is at a location where calls are answered infrequently;

wherein projecting the presence information of the second user comprises projecting information indicating an unavailability of the second user to the first user based upon the condition of the third user, wherein the condition of the third user is selected from the group consisting of: the third user is unavailable; the third user is not associated with a predetermined presence attribute value; and the third user is in a vicinity of the first user and is on a blacklist of the second user.

2. A method for determining presence information of users, the method comprising:

obtaining a condition concerning a first user within a communication network;

determining presence information of a second user within the communication network based upon the condition of the first user;

projecting the presence information of the second user to the first user; and obtaining a condition concerning a third user;

wherein the condition of the first user is selected from the group consisting of: presence information associated with the first user; a characteristic of a call at the first user; an identity of a folder being accessed by the first user; a type of document being accessed by the first user; an email being addressed by the first user; a phrase in a document being accessed by the first user; a location of the first user relative to the second user; whether the first user is driving a vehicle; a visual communication capability of the first user; whether the first user is attending a meeting; a voice quality environment of the first user; a call history statistic of the first user; whether the first user is using a speaker phone; whether the first user is participating in a Push-to-Talk call; whether the first user has a low reputation of having calls of being answered; and whether the first user is at a location where calls are answered infrequently;

wherein projecting the presence information of the second user comprises projecting information indicating an availability of the second user to the first user based upon the third user being in a vicinity of the first user and having a ranking status.

3. A device for presenting presence information, the device comprising:

a network receiver;

a network transmitter; and a controller coupled to the network receiver and to the network transmitter, the controller:

adapted to receive a condition concerning a first user via the network Receiver;

adapted to determine presence information of a second user based upon the condition of the first user; and adapted to transmit the presence information to the first user via the network transmitter;

wherein the condition of the first user is selected from the group consisting of: presence information associated with the first user; a characteristic of a call at the first user; an identity of a folder being accessed by the first user; a type of document being accessed by the first user; an email being addressed by the first user; a phrase in a document being accessed by the first user; a location of the first user relative to the second user; whether the first user is driving a vehicle; a visual communication capability of the first user; whether the first user is attending a meeting; a voice quality environment of the first user; a call history statistic of the first user; whether the first user is using a speaker phone; whether the first user is participating in a Push-to-Talk call; whether the first user has a low reputation of having calls of being answered; and whether the first user is at a location where calls are answered infrequently;

wherein the controller is further adapted to obtain a condition concerning a third user; wherein the controller transmits the presence information of the second user indicating an unavailability of the second user to the first user when a condition associated with the third user exists, the condition being selected from the group consisting of: the third user is unavailable; the third user is not associated with a predetermined presence attribute value; and the third user is in a vicinity of the first user and is on a blacklist of the second user.

4. A device for presenting presence information, the device comprising:

a network receiver;

a network transmitter; and a controller coupled to the network receiver and to the network transmitter, the controller:

adapted to receive a condition concerning a first user via the network receiver;

adapted to determine presence information of a second user based upon the condition of the first user; and adapted to transmit the presence information to the first user via the network transmitter;

wherein the condition of the first user is selected from the group consisting of: presence information associated with the first user; a characteristic of a call at the first user; an identity of a folder being accessed by the first user; a type of document being accessed by the first user; an email being addressed by the first user; a phrase in a document being accessed by the first user; a location of the first user relative to the second user; whether the first user is driving a vehicle; a visual communication capability of the first user; whether the first user is attending a meeting; a voice quality environment of the first user; a call history statistic of the first user; whether the first user is using a speaker phone; whether the first user is participating in a Push-to-Talk call; whether the first user has a low reputation of having calls of being answered; and whether the first user is at a location where calls are answered infrequently;

wherein the controller is further adapted to obtain a condition concerning a third user; wherein the controller transmits the presence information of the second user indicating an availability of the second user to the first user when the third user is in a vicinity of the first user and has a ranking status.

* * * * *